(No Model.)

E. MARGOLIES.
CAR SPITBOX.

No. 600,923. Patented Mar. 22, 1898.

WITNESSES:
Gustave Dieterich
John Kehlenbeck

INVENTOR
Edward Margolies

BY
Taylor & Russell
ATTORNEYS.

UNITED STATES PATENT OFFICE.

EDWARD MARGOLIES, OF NEW YORK, N. Y.

CAR SPIT-BOX.

SPECIFICATION forming part of Letters Patent No. 600,923, dated March 22, 1898.

Application filed April 14, 1897. Serial No. 632,077. (No model.)

*To all whom it may concern:*

Be it known that I, EDWARD MARGOLIES, a citizen of the United States, residing at New York, N. Y., have invented certain new and useful Improvements in Spit-Boxes, of which the following is a specification.

This invention relates to spit-boxes for use in cars, and in which the top of the box is substantially flush with the car-floor, and has for its object to provide a spit-box with a large mouth, covered with a grid in such manner as to permit expectoration and cigar-butts to readily reach the receptacle below and at the same time to afford protection from tripping or slipping thereon, and also to admit of disinfecting and deodorizing the receptacle and absorbing liquid passing thereinto, and of the ready removal of the disinfectant, absorbent, and deodorant, and of the absolute cleaning of the receptacle, reference being had to the accompanying drawings, wherein—

Figure 1:
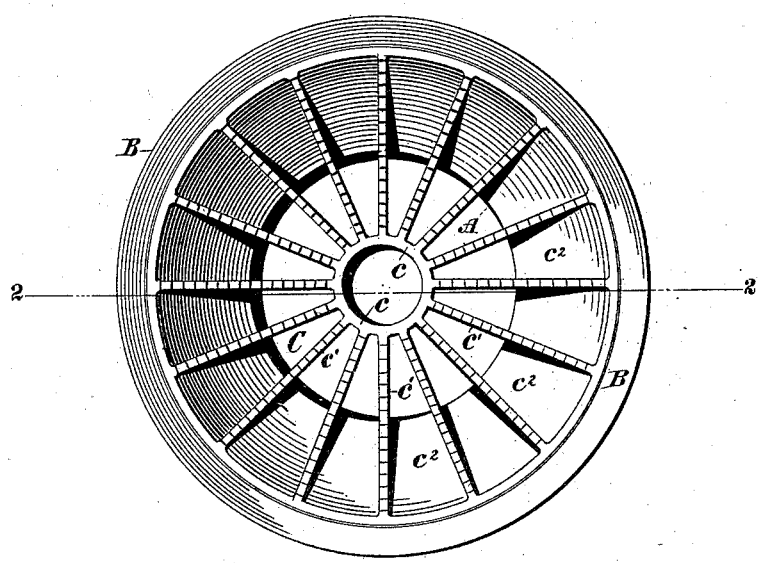
Figure 2:
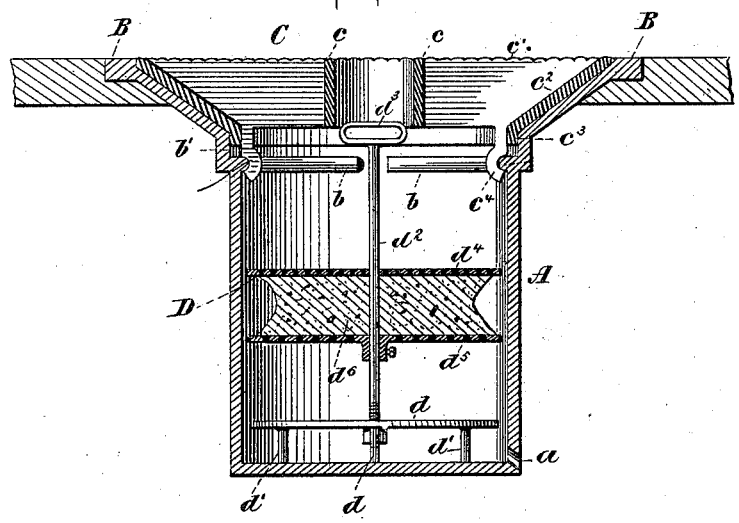

Figure 1 is a top view, and Fig. 2 is a section on line 2 2 of Fig. 1.

In the drawings, A designates a car-spit-box receptacle, provided with a hole $a$ in the side and a conically-flaring mouth B, into which is fitted a grid C, having a central walled opening $c$, from which walls radiate thin arms $c'$ toward and ending at a shelving-frame $c^2$, which frame conforms in shape to the flaring mouth and is adapted to be removably held in place by means of hooks $c^4$ $c^4$, depending from two of the arms, by engagement with a broken bead $b$ on the inside of the mouth, and the grid is also steadied by a perpendicular flange $c^3$ on the grid entering and resting in a rabbet $b'$ in the mouth. A holder D for an absorbent, deodorant, and disinfectant is adapted to be removably contained in the receptacle. In the holder D is a plate $d$ of slightly smaller diameter than the inside of the receptacle, which plate is provided with depending feet $d'$ $d'$ and supports a spindle or rod $d^2$, which projects upward nearly to the grid and ends in a handle $d^3$. The spindle $d^2$ supports the holder proper, which comprises two foraminated plates $d^4$ and $d^5$, the lower of which, $d^5$, is rigidly secured on the spindle, and the upper, $d^4$, is movable vertically on the spindle, between which plates an absorbent, disinfectant, and deodorant $d^6$ may be placed.

The device operates as follows: The receptacle is let through a hole in the floor, and the flaring mouth rests in a countersink, the grid being substantially flush with the upper surface of the floor. An absorbent, disinfectant, and deodorant, such as peat-moss, is placed in the holder proper. It is inserted into the receptacle, and the grid placed in position, resting on the mouth, and rotated to permit the hooks to engage the bead. The particular form of grid employed presents the smallest amount of horizontal surface possible, and the shelving-frame is adapted to convey into it expectorations which otherwise would not reach the receptacle. The central opening in the grid is intended to afford a passage for cigar-butts, &c., which after passing therethrough will lodge on the upper foraminated plate. Liquids will be absorbed by the material between the plates; but any excess of liquid will percolate therethrough and fall upon the lower plate, over its sides, and out through the hole in the receptacle, if such hole be open. The function of the lower plate is to catch any of the particles of absorbent material which may be carried along with the liquid.

To clean the spit-box, the grid is removed the holder withdrawn, and the receptacle flushed. After removing the cigar-butts and the particles of displaced absorbent, renewing the absorbent when necessary, the parts may be replaced again.

I claim—

1. An absorbent, disinfectant, and deodorant holder, adapted to be placed in spit-boxes, comprised of a plate, feet depending therefrom and a spindle projecting upwardly from said plate and terminating in a handle, a foraminated plate rigid on said spindle and a foraminated plate superimposed on said spindle and capable of vertical movement thereon.

2. In a car spit-box the combination of a receptacle, a grid covering the mouth thereof, an absorbent-holder therein comprised of a plate of smaller area than the inside of the receptacle, feet depending from the plate and adapted to raise the plate off the bottom of the receptacle, a spindle projecting upwardly from said plate, two foraminated plates superimposed on the spindle, and adapted to retain an absorbent, deodorant and disinfectant.

3. In a car spit-box the combination of a flaring-mouthed receptacle, a broken bead below the mouth, and a hole in the side of the bottom, a grid, having an inwardly-shelving frame, a central vertical walled opening, thin arms ribbed on their upper sides radiating therefrom, and toward and ending against the upper face of the shelving-frame, hooks depending from some of the arms and adapted for engagement with the bead, a holder within the receptacle, comprised of a plate of less area than the receptacle at its point of occupancy, depending feet on the plate, adapted to rest on the bottom of the receptacle, a spindle projecting upwardly from said plate and terminating in a handle, two foraminated plates superimposed on said spindle, the lower of said plates being rigid on the spindle, the upper being movable vertically thereon.

EDWARD MARGOLIES.

Witnesses:
MATTHEW TAYLOR,
CHARLES E. HOLMES.